US008044171B2

(12) United States Patent
Buhler et al.

(10) Patent No.: US 8,044,171 B2
(45) Date of Patent: Oct. 25, 2011

(54) POLYAMIDE MOLDING COMPOUND AND ITS USE FOR PRODUCING TRANSPARENT, HOT-STEAM-STERILIZABLE MOLDED PARTS AND EXTRUDATES

(75) Inventors: Friedrich Severin Buhler, Thusis (CH); Ralf Hala, Lindenberg (DE)

(73) Assignee: EMS-Chemie AG, Domat/EMS (CH)

( * ) Notice: Subject to any disclaimer, the term of this patent is extended or adjusted under 35 U.S.C. 154(b) by 352 days.

(21) Appl. No.: 12/162,981

(22) PCT Filed: Jan. 31, 2006

(86) PCT No.: PCT/EP2006/050556
§ 371 (c)(1),
(2), (4) Date: Jul. 31, 2008

(87) PCT Pub. No.: WO2007/087896
PCT Pub. Date: Aug. 9, 2007

(65) Prior Publication Data
US 2010/0022742 A1    Jan. 28, 2010

(51) Int. Cl.
*C08G 69/26* (2006.01)
(52) U.S. Cl. ........ 528/346; 528/310; 528/324; 528/329; 528/338; 525/432
(58) Field of Classification Search .......... 528/346, 528/310, 324, 329, 338; 525/432
See application file for complete search history.

(56) References Cited

U.S. PATENT DOCUMENTS

| | | | |
|---|---|---|---|
| 4,731,421 A | 3/1988 | Hoppe | |
| 4,847,356 A * | 7/1989 | Hoppe et al. | 528/346 |
| 4,898,896 A | 2/1990 | Maj | |
| 2002/0128377 A1 * | 9/2002 | Torre et al. | 524/600 |

FOREIGN PATENT DOCUMENTS

| | | |
|---|---|---|
| DE | 2642244 A1 | 3/1977 |
| DE | 3600015 A1 | 7/1986 |
| EP | 0050742 A1 | 5/1982 |
| EP | 0055335 A2 | 7/1982 |
| EP | 0313436 B1 | 4/1989 |
| EP | 0553581 A2 | 8/1993 |
| EP | 0725101 B2 | 8/1996 |
| EP | 0725100 B1 | 3/1998 |
| EP | 0885930 A1 | 12/1998 |
| GB | 1548431 A | 7/1979 |

\* cited by examiner

*Primary Examiner* — James J Seidleck
*Assistant Examiner* — Gregory Listvoyb
(74) *Attorney, Agent, or Firm* — Browdy and Neimark, PLLC

(57) ABSTRACT

The invention relates to a polyamide molding material or copolyamide molding material and the use of such a polyamide molding material or copolyamide molding material for producing steam-sterilizable transparent moldings and extrudates. This polyamide molding material is characterized in that it comprises at least one copolyamide formed from 35-42 mol % of bis(4-amino-3-methylcyclohexyl)methane (MACM), 35-42 mol % of isophthalic acid (IPS) and 16-30 mol % of laurolactam (LC12). MACM may be replaced up to 50% by bis(4-aminocyclohexyl)-methane (PACM) and IPA up to 50% by terephthalic acid (TPA). The polyamide molding material may also be a blend of copolyamides or a blend of copolyamides with polyamide 12. The relative viscosity (RV) of the polyamide molding material or copolyamide molding material is in any case adjusted to a value which is greater than 1.45. Steam-sterilizable and transparent standard specimens which are produced from such polyamide molding materials or copolyamide molding materials and whose composition corresponds to the transparent moldings and extrudates have a tensile strain at break which, after undergoing at least 140 and especially preferably at least 350 steam sterilization cycles, is above the stretching limit.

18 Claims, No Drawings

POLYAMIDE MOLDING COMPOUND AND ITS USE FOR PRODUCING TRANSPARENT, HOT-STEAM-STERILIZABLE MOLDED PARTS AND EXTRUDATES

The present invention relates to a polyamide molding compound for producing transparent, hot-steam-sterilizable molded parts and extrudates according to the preamble of independent Claim 1, as well as the use of this polyamide molding compound for producing such transparent, hot-steam-sterilizable molded parts and extrudates, according to the preamble of independent Claim 9. In addition, the present invention relates to a copolyamide molding compound for producing transparent, hot-steam-sterilizable molded parts and extrudates according to the preamble of independent Claim 3, as well as the use of this copolyamide molding compound for producing such transparent, hot-steam-sterilizable molded parts and extrudates according to the preamble of independent Claim 11.

Objects may be sterilized in boiling water (i.e., at approximately 100° C.) or at elevated temperature in saturated water steam (steam sterilization) or dry gas atmosphere (hot air sterilization). Hot-steam sterilization is the safest method in hospitals and in practice. It is preferable to all other sterilization methods. At a sterilization temperature of 121° C., an action time of at least 15 minutes is to be maintained, at 134° C., at least 3 minutes. Deviations therefrom require prior validation. The validation requirements are stated in Austrian Norm EN 554. In relation to hot steam sterilization, hot air sterilization conceals an array of unsafe features: with dry heat, the heat transfer to the sterilization product occurs relatively slowly and the sterilization success may be impaired by the formation of cold islands; a method validation for hot air sterilization is therefore not possible (cf. www.infektionsnetz.at).

Transparent plastics which are sterilizable using hot steam are to have a glass transition temperature (Tg value) of at least 180° C., so that they do not suffer any mechanical or visual quality losses or shape changes during the preferred hot-steam sterilization at 134° C. Instead of the sterilization time of 3 minutes, in connection with the present invention, the duration of the hot steam sterilization at 134° C. is increased to 7 minutes in order to obtain a safety factor of at least 2. In addition, the products are to withstand at least 100 hot steam sterilization cycles, preferably at least 130 hot steam sterilization cycles, without suffering visible changes or deviations in their dimensions.

Known transparent products such as TROGAMID® CX (PA PACM12) und TROGAMID® T5000 (PA 6-3-T) from Degussa do not meet this internal test standard because they have a Tg value of 140° C. and 153° C., respectively. PACM stands for bis-(4-amino-cyclohexyl)methane. The transparent, colorless, and amorphous homopolyamides disclosed in European Patent EP 0 725 101 B2 have a Tg value of approximately 157° C. and are known as GRILAMID® TR 90 (PA MACM12). MACM stands for bis-(4-amino-3-methyl-cyclohexyl)methane. Transparent copolyamides having bis-(4-amino-3,5-diethyl-cyclohexyl)methane as a diamine and their use for producing molded bodies, which have outstanding transparency and hydrolysis resistance in boiling water at a preferred Tg value of 140-170° C., are known from German Patent Specification DE 36 00 015 C2. However, all of these materials are not suitable for producing hot-steam-sterilizable molded parts and extrudates, which are to withstand more than 100 hot steam sterilization cycles at 134° C. and for 7 minutes without damage, since they suffer deformation and/or display cracks under these conditions.

Aromatic dicarboxylic acids, such as isophthalic acid (IPS or I) or mixtures thereof with up to 50 weight-percent terephthalic acid (TPS or T), form amorphous, high transparency polyamides having a Tg value of greater than 240° C. with MACM, for example. Products made of this material are not producible in typical polymerization kettles and are poorly processable.

Aliphatic and cycloaliphatic polyamides having aliphatic dicarboxylic acids having 4 to 36 C atoms, such as MACM12 (see comparative example 4), MACM36, PACM12 (see comparative example 5), and/or PACM36, or mixtures thereof do not withstand these test sterilization conditions (134° C./7 minutes); they deform or become cloudy. This is also true of polyamides made of aromatic dicarboxylic acids and aliphatic diamines having 4 to 36 C atoms, such as PA 6I, PA 12I, and/or PA 6I/6T or mixtures thereof.

Sterilizable copolyamides are known from the prior art. Thus, for example, EP 0 055 335 B1 discloses a transparent polyamide, resistant to boiling water, which is sterilizable at 122° C. for 24 hours without cloudiness or a deformation of the molded parts being detectable. Document EP 0 050 742 B1 also discloses trans-parent polyamides which are resistant to boiling water and sterilization. These polyamides have a Tg value of 166° C. (PACMI/PACM12 at 45/55 mol-percent) and of 175° C. (PACMI/PACM12 at 50/50 mol-percent), respectively, but they are not suitable for hot steam sterilization over 100 times (134° C./7 minutes) merely because of their Tg value of less than 180° C. This also applies to the glass-clear transparent polyamides disclosed in DE 26 42 244 A1, having Tg values of 140 to 170° C., whose stability was solely tested in boiling water.

The polyamides described in EP 0 725 100 B1 (MACMI/12), which have been produced and distributed by the current applicant under the name GRILAMID® TR 70, do have a Tg value of 200° C., but only survive 5 test sterilization cycles at 134° C./7 minutes undamaged (see comparative example 9). In addition, polyamides having such a high Tg value are difficult to produce and process.

Parts for medical and food technology, which are sterilizable using hot steam multiple times, made of polysulfone (PSU, such as ULTRASON® S from BASF), polyphenylsulfone (PPSU), polyethersulfone (PESU, such as ULTRASON® E from BASF), and polyetherimide (PEI, such as ULTEM® 1010 from General Electric), are used, but are known to be very yellowish and very costly.

All of the compositions cited up to this point are not suitable or are only suitable in a limited way for either economic or method technology reasons, because of their too low or too high Tg values, as molding compounds for producing transparent, hot-steam-sterilizable molded parts and extrudates, which may withstand at least 100 hot steam sterilization cycles (134° C./7 minutes), preferably at least 130 hot steam sterilization cycles, without visible harm and without mechanical damage. The known prior art discloses no data about the suitability of products in regard to their ability to be sterilized multiple times, which is currently performed predominantly at 134° C. for safety and time reasons. Sterilization temperatures of 122° C., as were applied in EP 0 055 335 B1 and EP 0 050 742 B1, represent significantly less drastic conditions and allow lower Tg values of the products without deformations occurring, for example.

The object of the present invention is to suggest alternative molding compounds which may be used for producing transparent, hot-steam-sterilizable molded parts and extrudates, as well as transparent, hot-steam-sterilizable standard test bodies (ISO test bodies), having a corresponding composition, the standard test bodies being able to withstand at least 100 hot steam sterilization cycles (134° C./7 minutes), preferably at least 130 hot steam sterilization cycles, without the elongation at tear falling below the yield point and without visible damage or deformation occurring.

This object is achieved according to a first aspect of the present invention by the features of independent Claim 1, in that a polyamide molding compound for producing transparent, hot-steam-sterilizable molded parts and extrudates is suggested. This polyamide molding compound is characterized in that it at least contains a copolyamide made of:
a) 35-42 mol-percent bis-(4-amino-3-methyl-cyclohexyl) methane (MACM), which may be replaced up to 50% by bis-(4-amino-cyclohexyl)methane (PACM);
b) 35-42 mol-percent isophthalic acid (IPS), which may be replaced up to 50% by terephthalic acid (TPS);
c) 16-30 mol-percent laurin lactam (LC 12),
the relative viscosity (RV) of the polyamide molding compound being greater than 1.45.

The stated object is achieved according to second aspect by the features of independent Claim 3, in that a copolyamide molding compound for producing transparent, hot-steam-sterilizable molded parts and extrudates is suggested. The copolyamide molding compound according to the present invention is characterized in that it is made of:
a) 35-42 mol-percent bis-(4-amino-3-methyl-cyclohexyl) methane (MACM), which may be replaced up to 50% by bis-(4-amino-cyclohexyl)methane (PACM);
b) 35-42 mol-percent isophthalic acid (IPS), which may be replaced up to 50% by terephthalic acid (TPS);
c) 16-30 mol-percent laurin lactam (LC 12),
the relative viscosity (RV) of the polyamide molding compound being greater than 1.45.

Standard testing bodies produced from such polyamide molding compounds and/or copolyamide molding compounds, whose composition correspond to the transparent, hot-steam-sterilizable molded parts and extrudates, have an elongation at tear value which is greater than the yield point of these standard testing bodies after being subjected to at least 140 hot steam sterilization cycles. Surprisingly, suitable monomer combinations and a special viscosity value have thus been found, so that these standard testing bodies mechanically withstand the test sterilization conditions (134° C./7 minutes) over 140 cycles without losing their transparency, displaying strong discoloration, or warping.

This object is achieved according to a third aspect of the present invention by the features of independent Claim 9, in that the use of a polyamide molding compound for producing transparent, hot-steam-sterilizable molded parts and extrudates is suggested. This polyamide molding compound is characterized in that it contains at least one copolyamide made of:
a) 35-42 mol-percent bis-(4-amino-3-methyl-cyclohexyl) methane (MACM), which may be replaced up to 50% by bis-(4-amino-cyclohexyl)methane (PACM);
b) 35-42 mol-percent isophthalic acid (IPS), which may be replaced up to 50% by terephthalic acid (TPS);
c) 16-30 mol-percent laurin lactam (LC 12),
the relative viscosity (RV) of the polyamide molding compound being greater than 1.45.

The stated object is achieved according to a fourth aspect of the present invention by the features of independent Claim 11, in that the use of a copolyamide molding compound for producing transparent, hot-steam-sterilizable molded parts and extrudates is suggested. This copolyamide molding compound is characterized in that it is made of
a) 35-42 mol-percent bis-(4-amino-3-methyl-cyclohexyl) methane (MACM), which may be replaced up to 50% by bis-(4-amino-cyclohexyl)methane (PACM);
b) 35-42 mol-percent isophthalic acid (IPS), which may be replaced up to 50% by terephthalic acid (TPS);
c) 16-30 mol-percent laurin lactam (LC 12),
the relative viscosity (RV) of the polyamide molding compound being greater than 1.45.

Standard test bodies (ISO tension test bars) produced according to these uses, having a composition corresponding to the transparent, hot-steam-sterilizable molded parts and extrudates, have an elongation at tear value which is greater than the yield point after being subjected to at least 140 hot steam sterilization cycles.

According to further embodiments, the standard test bodies produced from these polyamide molding compounds and/or copolyamide molding compounds have an elongation at tear value which is greater than the yield point after being subjected to at least 250, preferably at least 300, and especially preferably at least 350 hot steam sterilization cycles.

Preferred embodiments and further features according to the present invention result from the dependent claims.

In order to obtain hot-steam-sterilizable molded parts and extrudates, the polyamide molding compound and/or copolyamide molding compound according to the present invention must have the following properties:
Tg value: >180° C.
HDT/B conditioned: >140° C.
Relative viscosity >1.45

Extrudates are to be understood as profiles, tubes, hoses, films, plates, or hollow bodies, for example.

The production of the polyamide molding compound according to the present invention succeeds if, for example, in the system MACMI/MACMT/12 (the ratio of IPS to TPS preferably being in the range 1:1) the proportion of lactam 12 is at least 16 mol-percent but not more than 30 mol-percent and if the relative viscosity (measured at 20° C. in 0.5% m-cresol solution) is above 1.45, preferably above 1.50, especially preferably above 1.525. The proportion of PACM may be equal to the proportion of MACM, as described; however, even a minimal PACM proportion of at least 1 mol-percent also results in polyamide molding compounds and/or copolyamide molding compounds according to the present invention.

The glass transition temperature (Tg value) of the polyamide molding compounds and/or copolyamide molding compounds according to the present invention is to be at least 180° C., preferably at least 185° C., especially preferably at least 195° C.

The copolyamides according to the present invention are produced for the polyamide molding compounds and/or copolyamide molding compounds according to the present invention in a way known per se in known stirrable pressure autoclaves having a receiving vessel and a reaction vessel:

Deionized water is placed in the receiving vessel and the monomers and additives are added. The mixture is then made inert multiple times using nitrogen. With stirring, the mixture is heated to 180 to 230° C. under the resulting pressure to obtain a homogeneous solution. This solution is pumped through a screen into the reaction vessel and heated therein to the desired reaction temperature of 270 to 310° C. at a pressure of at most 30 bar. The batch is kept at the reaction temperature in the pressure phase for 2 to 4 hours. In the subsequent relaxation phase, the pressure is reduced to atmospheric pressure within 1 to 2 hours, whereby the temperature may decrease easily.

In the following degassing phase, the batch is kept at atmospheric pressure for 0.5 to 1 hours at a temperature of 270 to 340° C.

The polymer melt is discharged in strand form, cooled in the water bath at 15 to 80° C., and granulated. The granulate is dried for 12 hours at 80 to 120° C. under nitrogen to a water content of less than 0.06 weight-percent.

The relative viscosity of the copolyamides according to the present invention for the polyamide molding compounds according to the present invention may, as known to those skilled in the art, be adjusted by chemical and/or method-technology measures. The use of a chain control agent is possible as a chemical measure, with the following proviso: if the quantity of the chain control agent is increased, the relative viscosity decreases. Suitable chain control agents are monocarboxylic acids, such as benzoic acid, acetic acid, propionic acid, or monoamines, such as stearyl amine. Dicarboxylic acids or diamines or chain control agents having amine or carboxylic acid groups, which contain stabilizer groups of the HALS or tertiary butyl phenol types, such as triacetone diamine or isophthalic acid di-triacetone diamine derivatives, are known. Chain control agents having a stabilizer group result in improved light/UV and/or heat stability of the copolyamide. Preferred chain control agents for the copolyamides according to the present invention are benzoic acid, acetic acid, or triacetone diamine. These are used in concentrations of 20 to 100 mole per ton of final product, preferably 30 to 80 mole per ton of final product, still more preferably 40 to 50 mole per ton of final product.

Method-technology measures include, for example, changing the duration of the pressure phase, the duration of the degassing phase, the shutdown torque, or the temperature profile.

Suitable catalysts for accelerating the polycondensation reaction are acids containing phosphorus, such as $H_3PO_2$, $H_3PO_3$, $H_3PO_4$, their salts or organic derivatives, which simultaneously result in the reduction of the discoloration during the processing. The catalysts are added in the range from 0.01 to 0.5 weight-percent, preferably 0.03 to 0.1 weight-percent.

Suitable defoaming agents for avoiding foaming during the degassing are aqueous 10% emulsions which contain silicones or silicone derivatives and are used in quantities of 0.01 to 1.0 weight-percent, preferably 0.1 to 0.10 weight-percent.

In connection with the present invention, in addition to the amorphous polyamides, "transparent polyamides" also comprise those polyamides which are no longer completely amorphous, but are nonetheless still transparent because of their microcrystalline structure, which is invisible to the eye. Amorphous or microcrystalline polyamides predominantly contain cycloaliphatic diamines, aromatic dicarboxylic acids, and/or aliphatic dicarboxylic acids. Cycloaliphatic diamines are, for example, MACM (e.g., LAROMIN® from BASF), PACM (e.g., Dicykan from BASF), and cyclohexyl diamine. Aromatic dicarboxylic acids are, for example, isophthalic acid, terephthalic acid, and naphthalene dicarboxylic acids.

In connection with the present invention, the term "transparent polyamides" refers to (co)polyamides and/or (co)polyamide molding compounds whose light transmission is at least 70% when the polyamide is provided in the form of a plate, such as a round plate, having a thickness of 2 mm. Round plates of 70×2 mm are produced on an Arburg injection molding machine in the polished mold, the cylinder temperature being between 240 and 340° C. and the mold temperature being between 20 and 140° C. The light transmission is normally measured on a UV/VIS spectrometer from Perkin-Elmer in the range from 200 to 800 nm on these round plates of the dimensions 70×2 mm. The transmission value is specified in each case for a wavelength of 560 nm.

The yellow index is an important quality dimension for transparent, uncolored parts. Any yellowing of the polyamide molding compound may be compensated for by adding blue pigment before or during the further processing thereof.

In connection with the present invention, the term "polyamide" is understood to include:
homopolyamides;
copolyamides;
and the term "polyamide blend" is understood to include:
mixtures (blends) made of homopolyamides and copolyamides;
mixtures made of homopolyamides; and
mixtures made of copolyamides;

and the term "polyamide molding compound" is understood to include a molding compound which contains polyamides and/or polyamide blends, this polyamide molding compound being able to contain additives.

The test sterilization method (134° C./7 minutes) employed in connection with the present invention was performed as follows:

1. Equipment for the Hot Steam Sterilization

A 2549 E pressure autoclave from Tuttnauer having a chamber volume of 26 l is used. Shelves having perforated sheets for receiving the samples in four levels are located in the round interior of the horizontally oriented pressure chamber.

2. Standard Test Bodies and Pretreatment

ISO test bodies (standard: ISO/CD 3167, type A1, 170×20/10×4 mm) are laid on the shelves as injection molded without pretreatment, without touching one another. The autoclave is then closed and screwed tight. The quantity of test bodies required is established depending on the planned removal times.

3. Performing the Hot Steam Sterilization

The autoclave is heated to 134° C. and the previously apportioned water (approximately 350 ml) is vaporized in the autoclave. This procedure lasts 20 to 30 minutes at a vapor pressure rising up to 2 bar. After 5×7 minutes (corresponding to 5 counted cycles in sequence), the autoclave is cooled to room temperature. The next block of five then starts. Three test bodies are removed each time in accordance with the planned removal times.

4. Tensile Test on the Treated Test Bodies

The tensile test in accordance with ISO 527 is performed on three test bodies cooled to room temperature without further treatment. A traction speed of 5 mm/minute is used up to 2% stretching and a traction speed of 50 mm/minute is used above 2% stretching. The mechanical values represent mean values from three individual values.

5. Analysis of the Hot-Steam-Sterilizability as a Number of Cycles

A test body is considered hot-steam-sterilizable in regard to the mechanics as long as the elongation at tear remaining after X hot steam sterilization cycles exceeds the elongation at the yield point. The transparency is established as a second criterion. Hot-steam-sterilizability is provided in regard to transparency if no cracks, no discoloration recognizable upon observation with the naked eye, and a light transmission of at least 70% (according to the definition used in the present invention) are provided.

The copolyamides used in the examples and comparative examples are produced in a pressure autoclave whose reaction vessel has a volume of 300 l.

Monomers having a melting point in the range from −10° C. to +5° C., preferably −7° C. to −1° C. may be used as a bis-(4-amino-3-methyl-cyclohexyl)methane (MACM).

Monomers having a melting point in the range from 25° C. to 45° C., preferably 33.5° C. to 44° C., may be used as a bis-(4-amino-cyclohexyl)methane (PACM).

In all batches, additives required by the method are added, such as 25 to 30 weight-percent deionized water for a clear and homogeneous solution, defoaming agent for suppressing foaming, catalysts for accelerating the polycondensation, and excess diamines to equalize diamine losses.

The monomers used in the examples and comparative examples are characterized in Table 1.

TABLE 1

| Monomer | Commercial product | Melting point [° C.] | Sublimation temperature [° C.] | Producer |
|---|---|---|---|---|
| MACM | Laromin C260 | −7 to −1 | — | BASF AG |
| PACM | Dicycan | 33.5 to 44 | — | BASF AG |
| IPS | Purified Isophthalic Acid (PIA) | 345 to 348 | 100 at 0.07 mm Hg | BP Amoco Chemicals |
| TPS | Amoco TA-33 | 427 | 402 | BP Amoco Chemicals |
| Lactam 12 | Laurinlactam | 153 | — | EMS-CHEMIE AG |

The results achieved using the compositions according to the present invention are presented in Table 2:

TABLE 2

| Examples | Unit | Number 1 | 2 | 3 |
|---|---|---|---|---|
| Components | | | | |
| MACM | Mol-% | 19 | 38 | 38 |
| PACM | Mol-% | 22 | — | — |
| IPS | Mol-% | 41 | 38 | 19 |
| TPS | Mol-% | — | — | 19 |
| DDS | Mol-% | — | — | — |
| Lactam 12 | Mol-% | 18 | 24 | 24 |
| Tests | | | | |
| Transmission | % | 91.5 | 93.5 | 92.5 |
| Yellow index | — | 5 | 1 | 1 |
| Tg, dry | ° C. | 200 | 188 | 190 |
| RV | — | 1.51 | 1.49 | 1.49 |
| HDT B, dry | ° C. | 185 | 175 | 175 |
| HDT B, conditioned | ° C. | 175 | 155 | 155 |
| Mechanically survived sterilization cycles | Number | 200 | 150 | 435 |
| Visually survived sterilization cycles | Number | 200 | 150 | 350 |

In the following, the production of a copolyamide molding compound according to the present invention on the basis of the composition used in Example 3 is explained:

42 mg deionized water is provided in the delivery vessel of the 300 l pressure autoclave and a mixture made of 17.0 kg IPS and 17.0 kg TPS is stirred in. With the stirrer turned off, 48.2 kg MACM, 28.8 kg lactam 12, and 0.54 kg benzoic acid are added.

After it is rendered inert 10 times, the mixture is heated to 230° C., the stirrer being turned on again after reaching 180° C. The homogeneous solution is pumped through a screen into the reaction vessel at 230° C.

With stirring, the batch is heated therein to 295° C. and held in the pressure phase for 4 hours at 20 bar. Within 1.5 hours, it is relaxed to atmospheric pressure and subsequently degassed for 40 minutes.

The polymer melt is discharged, cooled in the water bath (65° C.), and granulated. The granulate is dried for 24 hours at 100° C. under nitrogen to a water content of less than 0.06 weight-percent.

The results achieved using standard compositions or compositions produced for comparative purposes are presented in Table 3:

TABLE 3

| | Unit | Comparative examples Number 4 | 5 | 6 | 7 | 8 | 9 | 10 | 11 |
|---|---|---|---|---|---|---|---|---|---|
| Components | | | | | | | | | |
| MACM | Mol-% | 50 | — | 23 | 21 | 20 | 40.5 | 38 | 38 |
| PACM | Mol-% | — | 50 | 27 | 24 | 23 | — | — | — |
| IPS | Mol-% | — | — | 34 | 45 | 43 | 40.5 | 38 | 19 |
| TPS | Mol-% | — | — | — | — | — | — | — | 19 |
| DDS | Mol-% | 50 | 50 | 16 | — | — | — | — | — |
| Lactam12 | Mol-% | — | — | — | 10 | 14 | 19.0 | 24 | 24 |
| Tests | | | | | | | | | |
| Transmission | % | 93.0 | 92.5 | 92.0 | 91.5 | 91.5 | 92.5 | 92.0 | 93.0 |
| Yellow index | — | 0.5 | 0.5 | 5 | 10 | 5 | 1 | 1 | 1 |
| Tg, dry | ° C. | 155 | 140 | 212 | 225 | 213 | 200 | 185 | 183 |
| RV | — | 1.73 | 1.85 | 1.52 | 1.48 | 1.48 | 1.40 | 1.38 | 1.39 |
| HDT B, dry | ° C. | 135 | 122 | 190 | 210 | 198 | 185 | 165 | 170 |
| HDT B, conditions | ° C. | — | — | 185 | 200 | 188 | 155 | 145 | 150 |
| Mechanically survived sterilization cycles | Number | 0 | 0 | 80 | 60 | 70 | 5 | 5 | 5 |
| Visually survived sterilization cycles | Number | 0 | 0 | 80 | 50 | 60 | 5 | 5 | 5 |

The abbreviations used in the tables are:
DA diamine
DDS dodecane diacid
HDT heat distortion temperature
IPS isophthalic acid (I)
Lactam 12 laurin lactam (L)
MACM bis-(4-amino-3-methyl-cyclohexyl)methane
PACM bis-(4-amino-cyclohexyl)methane
Tg glass transition temperature
TPS terephthalic acid (T)
RV relative viscosity The transmission was determined using a UV/VIS spectrometer from Perkin-Elmer.

The yellow index was measured in accordance with ASTM D1925 on round plates having a dimension of 70×2 mm. These round plates were produced on an Arburg injection molding machine in the polished mold, the cylinder temperature being between 240 and 340° C. and the mold temperature being between 20 and 140° C.

The glass transition temperature was determined using differential scanning calorimetry (DSC) at a heating rate of 10° C./min in accordance with ISO standard 11357-1/-2.

The relative viscosity (RV) was determined at 20° C. in a 0.5% m-cresol solution in accordance with ISO standard 307.

The HDT B value was determined in accordance with ISO standard 75-1/-2 (load 0.45 MPa).

Comparative examples 4 and 5 show that standard test bodies made of transparent polyamides relating to the standard materials, namely GRILAMID® TR 90 (MACM12) and TROGAMID® CX 7323 (PACM12), are not able to be sterilized under the conditions 134° C./7 minutes. The standard test bodies are already strongly deformed and unusable after 5 sterilization cycles.

In spite of high glass transition temperature (Tg value) and high relative viscosity (RV), standard test bodies made of the material of comparative example 6 may only be hot-steam sterilized 80 times without the elongation at tear falling below the yield point.

In spite of high glass transition temperature (Tg value) and high relative viscosity (RV), standard test bodies made of the materials of comparative examples 7 and 8 may only be hot-steam sterilized 60 and 70 times, respectively, without the elongation at tear falling below the yield point.

In contrast to the comparative examples, standard test bodies made of the material of example 1 according to the present invention, having a higher lactam 12 content than comparative examples 7 and 8, meet the stated requirements.

In example 2 according to the present invention and in comparative example 10, materials of identical composition, but having different relative viscosity, are used for producing the standard test bodies. This is correspondingly true for the materials of example 3 according to the present invention and comparative example 11. The materials of the comparative examples each have a lower viscosity and only withstand 5 hot steam sterilization cycles each. The relative viscosity of the materials used according to the present invention is therefore to be at least 1.45, preferably at least 1.50. A relative viscosity of greater than 1.525 is especially preferred.

The results of the hot steam sterilization test in regard to standard test bodies made of the composition according to the present invention having the number 3 are shown in Table 4:

TABLE 4

| Number 3 | Unit | Number of sterilization cycles | | | | | | | |
|---|---|---|---|---|---|---|---|---|---|
| | | 0 | 50 | 100 | 140 | 165 | 200 | 350 | 435 |
| Elongation at tear | % | 34 | 15 | 14 | 14 | 11 | 10 | 9 | 8 |
| Yield point | % | 8 | 7 | 7 | 7 | 7 | 6 | 7 | 7 |

As is obvious from Table 4, the values for the elongation at tear after up to 435 hot steam sterilization cycles are above the values for the yield point. The corresponding standard test bodies therefore clearly meet the stated requirements for the mechanical stability, they have an elongation at tear value which is greater than the yield point after surviving at least 140 hot steam sterilization cycles.

In the event of a high relative viscosity of the composition according to the present invention, it is to be expected that the requirements will still be fulfilled after a significantly higher number of hot steam sterilization cycles.

The composition according to the present invention will be discussed in relation to the prior art on the basis of Table 5:

TABLE 5

| | Components of the polyamide composition in mol-percent | | | |
|---|---|---|---|---|
| | Lactam 12 | Cycloaliphatic | Aromatic dicarboxylic acid | |
| Disclosure | (L) | diamines | IPS (I) | TPS (T) |
| Present invention | 16-30 | MACM max. 35-42 min. 17.5-21 PACM min. 0 max. 17.5-21 | max. 35-42 min. 17.5-21 | min. 0 max. 17.5-21 |
| EP 0 553 581 B1 | $0 \leq L < 82$ | Only 1 DA possible 9-50 | max. 9-50 min. 0 | min. 0 max. 9-50 |
| EP 0 725 100 B1 | 0-20 | At least 1 DA 40-50 | max. 40-50 min. 20-25 | min. 0 max. 20-25 |
| EP 0 313 436 A1 | 32.5-74 | 13-33.75 | min. 0 max. 0 < IPS < 6.5 or 0 < I < 16.875 | max. 13-33.75 min. 6.5 < TPS < 13 or 16.875 < T < 33.75 |
| DE 26 42 244 | 45-56 | Only 1 DA possible 22-27.5 | max. 22-27.5 min. 11-13.75 | min. 0 max. 11-13.75 |

The components of the compositions in Table 5 are specified in mol-percent, the sum of the components lactam 12, cycloaliphatic diamines, and aromatic dicarboxylic acid being 100 mol-percent. For the conversion from weight-percent into mol-percent, the composition MACMI/MACMT/12 is used as a basis.

In EP 0 553 581 B1, blends made of two copolyamides are claimed. Only the component a) from the first claim is reproduced in the table, since the component b) does not intersect with the present invention because of the high lactam content. TPS and IPS are indirectly reflected in this publication by the parameters $y_1$ and $y_2$. The ratio of the two is not specified, so that only one of the components or an arbitrary mixture thereof may be provided. A terephthalic acid component which is predominant over the isophthalic acid component is (preferably) requested in EP 0 553 581 B1. Although the extraordinarily broad claim wording in document EP 0 553 581 B1 coincidentally partially comprises the composition of the present invention, the applicants for that protected right have not recognized that a polyamide molding compound and/or copolyamide molding compound whose composition corresponds to a very narrowly selected range of a part of this Claim 1 is suitable for producing transparent, hot-steam-sterilizable molded parts and extrudates which withstand at least 140 hot-steam sterilization cycles.

The copolyamides described in EP 0 725 100 B1 do display slight overlaps with the copolyamides of the present invention in regard to the formulation of the boundaries of the disclosed ranges, however, it is not noted anywhere in this publication that transparent molded parts and extrudates which are sterilizable using hot steam multiple times under the conditions 134° C./7 minutes are producible from a selected small part of the copolyamides disclosed therein and further undisclosed copolyamides. This was apparently not recognized in EP 0 725 100 B1.

The ratio $y_1$ ("TPS") to $y_2$ ("IPS") is fixed by the formula $y_1/(y_1+y_2)>0.5$ in EP 0 313 436 A1, i.e., $y_1$ is always greater than $y_2$. In addition, $y_2$ may be zero, which is not possible for $y_1$. It is also specified in the description, on page 2, lines 24 through 25, that in the case of a mixture of TPS and IPS, the TPS component will outweigh the IPS component. The copolyamides described in EP 0 313 436 A1 only display slight overlaps with the copolyamides of the present invention in regard to lactam and diamine content. TPS must predominate in the ratio of IPS to TPS in EP 0 313 436 A1, while in contrast IPS must predominate in the copolyamides according to the present invention. In addition, the TPS component may be zero in the copolyamides according to the present invention, while TPS is absolutely required in EP 0 313 436 A1. In addition, the necessarily higher lactam 12 component in EP 0 313 436 A1 is noteworthy here.

The copolyamides disclosed in DE 26 42 244 differ significantly in composition from the copolyamides according to the present invention, the significantly higher lactam 12 component particularly being noted.

In an alternative embodiment of the present invention, the polyamide molding compound may be a blend made of multiple copolyamides according to the present invention.

In a further, alternative embodiment of the present invention, the polyamide molding compound may be a blend made of at least one of the copolyamides and polyamide 12, the total content of the polyamide molding compound of laurin lactam being 16-30 mol-percent.

These alternative embodiments may be produced in a way known per se on typical compounding machines, such as single-shaft or dual-shaft extruders or screw mixers by compounding the granulated mixture of the components at cylinder temperatures set to 260° C. to 340° C.

A further possibility for producing these alternative embodiments is mixing the granulates of the components into a homogeneous dry blend, which is subsequently processed further in a processing machine, such as a screw injection molding machine or extruder, to form the desired molded part or extrudates at cylinder temperatures set to 260° C. to 340° C.

A polyamide molding compound may also be a blend made of at least two copolyamides or blend made of at least one copolyamide and polyamide 12. In all blends, the relative viscosity (RV) also plays an important role. Therefore, according to the present invention, at least the polyamide molding compound, but preferably even the components used for the blend, have an RV value which is greater than 1.45, preferably greater than 1.50, and especially preferably greater than 1.525.

It is also to be noted that the polyamide molding compounds and/or copolyamide molding compounds may also contain typical additives, such as stabilizers (heat and UV stabilizers of various types), flame retardants, processing aids, antistatic agents, colorants, fillers and reinforcing agents, in particular nanoscale fillers and reinforcing agents, such as minerals having a particle size of at most 100 nm or unmodified or modified phyllosilicates and further additives. For example, IRANOX® 1098 or IRGANOX® 1010 may be used as heat stabilizers. For example, TINUVIN® 312 or 770 and/or NYLOSTAB® SEED may be used as UV stabilizers. UV400 protection may be achieved, for example, using TINUVIN® 326 or 327. The stabilizers may be added directly or as a masterbatch having polyamide as a carrier material. For example, TINOPAL® DMSX or UNIVEX® OB may be used as an optical brightening agent. VERSAPOL® may be used as a lubricant or inclusion reducer. These additives are added to the polyamide molding compound in a way known per se, e.g., in the polycondensation or afterward in an extrusion.

For example, injection molding, injection compression, injection blow molding, or injection stretch blowmolding are suitable for producing molded bodies, and any form of extrusion, such as extrusion blowmolding, profile extrusion, and tubular extrusion, are suitable for producing extrudates as processing methods for the polyamide molding compounds and/or copolyamide molding compounds according to the present invention.

The molded bodies or extrudates may be processed using milling, drilling, grinding (e.g., lenses, corrective or non-corrective), laser marking, laser welding, and laser cutting, for example. The polyamide molding compounds and/or copolyamide molding compounds according to the present invention may be colored in a way known per se. The molded bodies produce according to the present invention may also be colored in immersion baths or coated using immersion lacquer (hard coat). If necessary, the molded bodies produced according to the present invention may also be provided with an antireflective coating and/or bloomed.

All methods known per se for producing flat, blown, or cast films in the form of single-layer or multilayer films may be used as processing methods for the polyamide molding compounds and/or copolyamide molding compounds according to the present invention. These films may also be treated further, for example, by laminating, stretching, drawing, printing, or dyeing.

Preferred applications of the transparent polyamide molding compounds and/or copolyamide molding compounds according to the present invention relate to the production of hot-steam-sterilizable molded parts and extrudates for the medical field, such as medical tools, catheters, instruments, apparatus housings, connectors, valves, inhalers, tubes, containers, mouthpieces, support rails, and flexible or rigid lines in medical apparatus for breathing air and/or bodily fluids, for example.

Numerous device components which come into contact with hot steam are conceivable for the technical field, such as spray nozzles for water steam in coffee machines, household appliances, steam cookers and steam cleaners; kitchen dishware and covers, particularly for use in microwave devices, pan lids, hair curlers, combs, drying hoods or pipes, fittings, apparatus and lines, e.g., for beverage transport, such as beer lines, in particular in vending machines.

In the packaging field, molded parts and extrudates produced according to the present invention may be used, for example, for containers, tubes, bottles, beakers, measurement beakers, boxes, and films. The most important industrial branches for this purpose are the food, beverage, cleaner, and dye industries. The molded parts and extrudates are also suitable for hot filling.

The high chemical resistance and the high toughness of the molded parts or extrudates allows their use in connection with aggressive media, in particular liquids and gases, for example, in closures, in particular textile closures which are dry cleaned. In addition, they may be used in gas masks, filter cups, flow meters, medical devices, filter housings, glazing, lamp housings, displays for mobile telephones, game consoles, GPS devices, or in other electronic devices or components such as display screens, display screen films, or packages.

Further applications comprise, for example, protective sheaths for optical fibers, cable casings, optical fibers, and trays and dishware for self-service restaurants.

The invention claimed is:

1. A copolyamide molding compound for producing hot-steam-sterilizable, transparent molded parts and extrudates, characterized in that it is made of:
   a) 38 mol-percent bis-(4-amino-3-methyl-cyclohexyl) methane (MACM);
   b) 38 mol-percent isophthalic acid (IPS), which is replaced up to 50% by terephthalic acid (TPS); and
   c) 24 mol-percent laurin lactam (LC 12),
   the relative viscosity (RV) of the polyamide molding compound being greater than 1.45.

2. The copolyamide molding compound according to claim 1, characterized in that hot-steam-sterilizable and transparent standard test bodies, produced from said copolyamide molding compound, corresponding to the transparent molded parts and extrudates, have an elongation at tear value, which is greater than the yield point after being subjected to at least 140 hot-steam sterilization cycles.

3. The copolyamide molding compound according to claim 2, characterized in that the standard test bodies produced from said copolyamide molding compound have an elongation at tear value, which is greater than the yield point after being subjected to at least 250 hot-steam sterilization cycles.

4. The copolyamide molding compound according to claim 1, characterized in that it has a relative viscosity of at least 1.50.

5. In a method of use of a copolyamide molding compound comprising producing a transparent, hot-steam-sterilizable molded part or extrudate, the copolyamide molding compound is made of:
   a) 38 mol-percent bis-(4-amino-3-methyl-cyclohexyl) methane (MACM);
   b) 38 mol-percent isophthalic acid (IPS), which is replaced to 50% by terephthalic acid (TPS); and
   c) 24 mol-percent laurin lactam (LC 12),
   the relative viscosity (RV) of the polyamide molding compound being greater than 1.45.

6. The method according to claim 5, characterized in that transparent, hot-steam-sterilizable standard test bodies, produced from said copolyamide molding compound, corresponding to the transparent molded parts and extrudates in their composition, have an elongation at tear value, which is greater than the yield point after being subjected to at least 140 hot steam sterilization cycles.

7. The method according to claim 6, characterized in that the standard test bodies produced from said copolyamide molding compound have an elongation at tear value, which is greater than the yield point after being subjected to at least 250 hot steam sterilization cycles.

8. The method according to claim 5, characterized in that the relative viscosity (RV) of the polyamide molding compound or copolyamide molding compound is set to a value, which is greater than 1.5.

9. The method according to claim 5, characterized in that the transparent, hot-steam-sterilizable molded parts and extrudates produced from said polyamide molding compound or copolyamide molding compound are medical articles.

10. The method according to claim 5, characterized in that the transparent, hot-steam-sterilizable molded parts and extrudates produced from said polyamide molding compound or copolyamide molding compound are household articles.

11. The method according to claim 5, characterized in that the transparent, hot-steam-sterilizable molded parts and extrudates produced from said polyamide molding compound or copolyamide molding compound are device components which come into contact with hot steam.

12. The method according to claim 5, characterized in that additives are admixed to the polyamide molding compound or copolyamide molding compound for producing said transparent, hot-steam-sterilizable molded parts and extrudates, in a quantity which does not allow the transparency to fall below the required value, the additives being selected independently from the group consisting of stabilizers, optical brightening agents, colorants, lubricants, and nanoscale fillers and reinforcing agents.

13. The copolyamide according to claim 4 having a relative viscosity of at least 1.525.

14. The copolyamide of claim 3 having a tear value greater than the yield point after being subjected to at least 300 hot-steam sterilization cycles.

15. The copolyamide according to claim 14 having an elongation at tear value which is greater than the yield point after being subjected to at least 350 hot-steam sterilization cycles.

16. The method of claim 7 wherein the standard test body produced from said copolyamide molding compound has an elongation at tear value which is greater than the yield point after being subjected to at least 300 hot-steam sterilization cycles.

17. The method according to claim 16 wherein the test body produced from said copolyamide molding compound has an elongation at tear value which is greater than the yield point after being subjected to at least 350 hot-steam sterilization cycles.

18. The method of claim 8 wherein the relative viscosity of the copolyamide molding compound is greater than 1.525.

* * * * *